United States Patent [19]

Aoki

[11] Patent Number: 4,645,443
[45] Date of Patent: Feb. 24, 1987

[54] MOLD-THICKNESS ADJUSTING APPARATUS IN MOLD CLAMPING MECHANISM

[75] Inventor: Katashi Aoki, Sakakimachi, Japan

[73] Assignee: Kabushiki Kaisha Aoki Seisakusho, Japan

[21] Appl. No.: 812,195

[22] Filed: Dec. 23, 1985

[30] Foreign Application Priority Data

Dec. 29, 1984 [JP] Japan .................................. 59-279153
Dec. 4, 1985 [JP] Japan .................................. 60-186998

[51] Int. Cl.⁴ ............................................. B29C 45/80
[52] U.S. Cl. ..................................... 425/150; 425/171; 425/589; 425/595
[58] Field of Search ............... 425/150, 171, 589, 595, 425/142, 178, 242

[56] References Cited

U.S. PATENT DOCUMENTS 3,656,877 4/1972 Aoki ..................................... 425/150
4,321,026 3/1982 Lambertus .......................... 425/142

Primary Examiner—Jay H. Woo
Assistant Examiner—Timothy W. Heitbrink
Attorney, Agent, or Firm—Ostrolenk, Faber, Gerb & Soffen

[57] ABSTRACT

The present invention provides a mold-thickness adjusting apparatus in a clamping mechanism for molding synthetic resins in which a clamping plate is inserted into and mounted on a plurality of tie bars provided over a pair of fixed plates on a machine bed, wherein despite the mold-thickness adjustment is effected by a connecting portion between a clamping ram and a clamping plate, a positional movement of the clamping plate resulting from rotation can be done smoothly, and even if mutual threads are temporarily brought into close contact with each other due to the concentration of the clamping force on the connecting portion, members can be rotated after the close contact has been relieved.

6 Claims, 6 Drawing Figures

MOLD-THICKNESS ADJUSTING APPARATUS IN MOLD CLAMPING MECHANISM

BACKGROUND OF THE INVENTION (1) Field of the Invention

This invention relates to a mold clamping mechanism in an injection molding machine, and particularly to a mold-thickness adjusting apparatus in a direct pressure type mold clamping mechanism.

(2) Prior Art

In a mechanism in which a clamping plate is movably provided between a pair of fixed plates, a clamping ram of a clamping cylinder provided on one fixed plate are connected, and a mold dividedly attached to the other fixed plate and the clamping plate is directly clamped by the clamping ram, if the clamping cylinder is designed to be lengthy, the clamping can be always carried out positively according to a mold thickness without the particular provision of a mold-thickness adjusting apparatus.

However, if the moving dimension of a piston within the clamping cylinder is large, it takes time for movement of the clamping ram to make it difficult to open and close the mold at high speeds. For this reason, even in the case of the direct-pressure type, mold-thickness adjusting means is usually provided.

According to the conventional mold-thickness adjusting means, a standard mold-thickness is determined according to the dimension of length of the clamping cylinder so that when the mold is thinner than the standard mold-thickness, a wedge or the like is engaged to increase the thickness.

Alternatively, a proposal has been made in which a clamping ram and a clamping plate are threadedly connected by a rotatable joint, so that the clamping plate may be moved back and forth by the rotation of the joint to effect the adjustment of mold-thickness. In this proposal, however, the clamping force is concentrated on the threaded portion of the joint to make it difficult to rotate the joint at the time of the mold-thickness adjustment due to the close contact of mutual threads. In addition, parts are often damaged thus failing to be useful for the mold-thickness adjustment, which is unsuitable for practical use.

SUMMARY OF THE INVENTION

This invention has been accomplished to overcome these problems noted above with respect to prior art. It is an object of the invention to provide a newly designed mold-thickness adjusting mechanism in which despite the mold-thickness adjustment is effected by a connecting portion between a clamping ram and a clamping plate, a positional movement of the clamping plate resulting from rotation can be done smoothly, and even if mutual threads are temporarily brought into close contact with each other due to the concentration of the clamping force on the connecting portion, members can be rotated after the close contact has been relieved not only to remove a difficulty in rotation due to the close contact but effect rotation by means of an electric motor or the like.

For achieving the aforementioned object, the apparatus of the present invention comprises a connecting ring secured to a central portion of a back surface of a clamping plate, a connecting tube rotatably fitted in the connecting ring having its extreme end in contact with the back surface of the clamping plate, said tube having a chuck portion provided at the rear thereof, said chuck portion being movably threadedly engaged with the extreme end of the clamping ram, and a member adapted to reduce in diameter a chuck formed in the rear end of the connecting tube, wherein said clamping and said clamping ram are connected, and a gear for rotating said connecting tube to adjust a position of said clamping plate according to a mold-thickness is meshed with a circumferential portion of a shell of said connecting tube and said connecting ring.

In the apparatus designed as described above, when after the mold has been mounted on the clamping plate and the fixed plate opposed to the clamping plate, the clamping plate is moved forward or backward by rotation of the connecting tube at a mold closed position with the clamping ram remained as it is, the clamping plate moves with the connecting tube till it comes into contact with the mold, where the adjustment of the mold-thickness is automatically made.

Since the connecting tube and the clamping ram are connected by the threads and the chuck, even if the threads becomes contacted closely under the influence of the clamping force, the rotation of mutual threads may be achieved easily by the relief of the chuck, thus freeing of difficulty in rotation even if the apparatus is used for a long period of time.

Moreover, according to the present invention, the clamping cylinder can be reduced in length, and high speed mold opening and closing can be also carried out by the cylinder and ram operatively connected to the rear end of the clamping ram. By additional use of a clamping cylinder designed to make the inside diameter of a cylinder larger than the diameter of a piston except the extreme end thereof in order to reduce a hydraulic resistance within the clamping cylinder during the mold opening and closing, it is also possible to provide a clamping mechanism whose mold opening and closing may be achieved at high speeds.

DETAILED DESCRIPTION OF THE PREFERRED EMBODIMENTS

Figure 1:
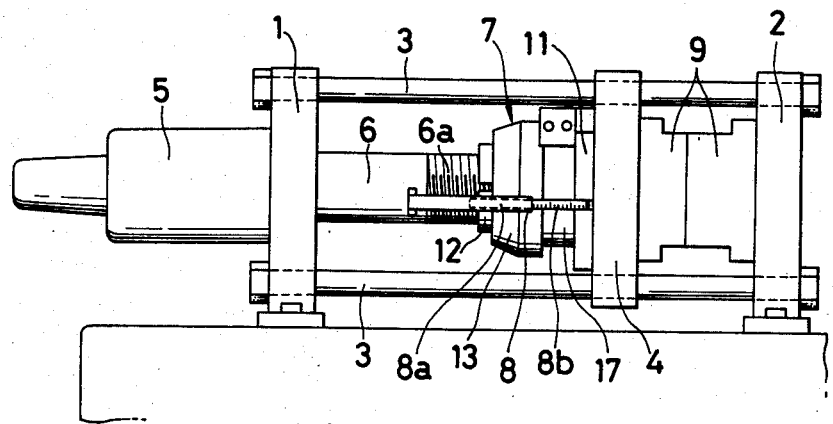
FIG. 1 is a side view of a clamping mechanism provided with a mold-thickness adjusting apparatus in accordance with the present invention.

Referring now to FIG. 1, a pair of fixed plates 1, 2 are stood upright on a machine bed in a predetermined spaced relation, and tie bars 3 are connected to the fixed plates 1, 2.

A clamping plate 4 is inserted through the tie bars 3 and provided opposite to the fixed plate 2. The clamping plate is connected through a mold-thickness adjusting apparatus 7 to a clamping ram 6 projected from a clamping cylinder 5 of the fixed plate 1. A display device 8 is disposed over the clamping plate 4 and the clamping ram 6 to indicate the moving amount of the clamping plate 4.

Reference numeral 9 designates a mold dividedly mounted on the fixed plate 2 and the clamping plate 4.

Figure 2:
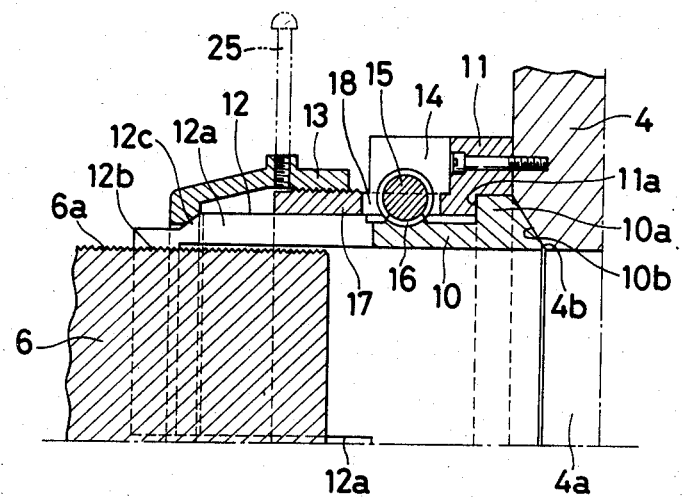
FIG. 2 is a partial longitudinal sectional side view of major portions of the adjusting apparatus in accordance with the present invention.
Figure 3:
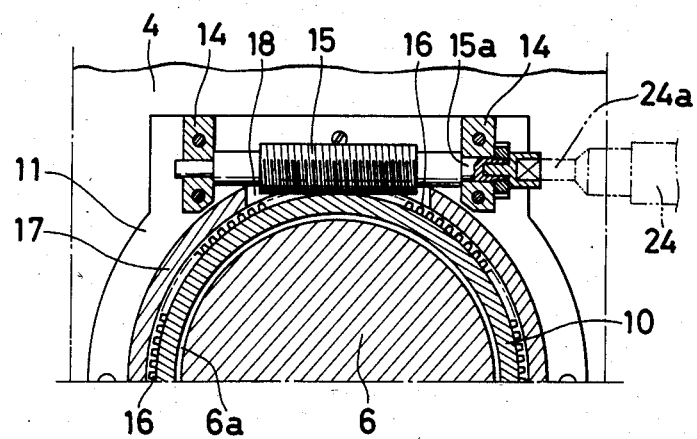
FIG. 3 is a partial front view of the same.
Figure 4:
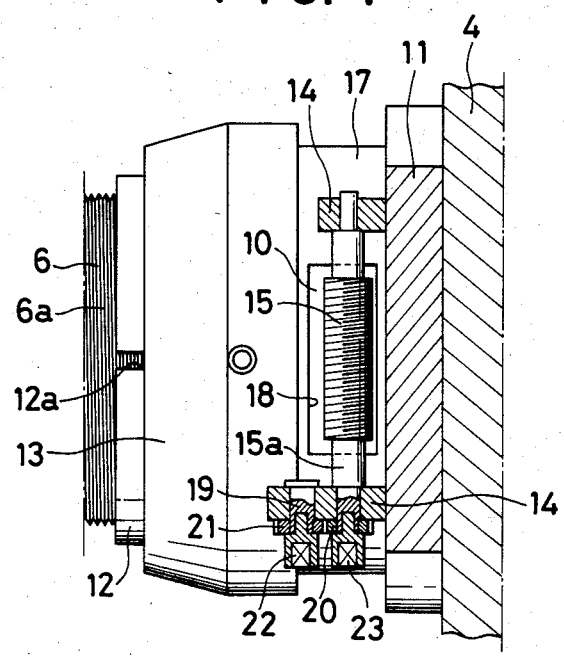
FIG. 4 is a partial front view of the same.

FIG. 2 and those that follow show the construction of the mold-thickness adjusting apparatus 7. The apparatus comprises a connecting tube 10 positioned between the clamping ram 6 and the clamping plate 4, a connecting ring 11 fixed concentric with a ram inserting hole 4a bored in a central portion of the back surface of the clamping plate, and an annular fastening member 13 fitted over and between a chuck 12 of the connecting tube 10 and a cylindrical portion 17 formed integral with the connecting ring 11 in order to fasten the rear end of the connecting tube formed in a chuck 12 by means of a plurality of axial expanding slots 12a.

The extreme end of the connecting tube 10 is formed into an umbrella-shape, a projecting edge 10a in the periphery of the extreme end is brought into engagement with a stepped portion 11a formed internally of the connecting ring 11, and an end face 1b formed into a tapered surface is brought into contact with a tapered surface 4b in the periphery of the ram inserting hole 2a and rotatably connected to the central portion of the back surface of the clamping plate 4 of the connecting tube 10.

The chuck 12 is formed internally of an opening thereof with threads 12b threadedly engaged with threads 6a formed in the outer periphery of the clamping ram 6, and formed in the outer surface thereof with a fastening inclined shoulder 12c in contact with the inside at the rear of the fastening member 13.

In the outer periphery of the shell of the connecting tube 10 is integrally formed a gear 16 meshed with a driving worm gear 15 laterally mounted on a bearing member 14 above the connecting ring 11, the worm gear 15 being received in a cut hole 18 bored in the cylindrical portion 17 for engagement with the gear 16 of the connecting tube 10.

In the periphery of the end of the cylindrical portion 17 is provided threads threadedly engaged with threads formed internally of the fastening member 13, and the first-mentioned threads and the inclined shoulder 12c cause the chuck 12 of the connecting tube 10 to reduce its diameter and fasten to the clamping ram 6. The connecting tube 10 is urged toward the clamping plate 4 to press the extreme end surface 10b against the tapered surface 4a in the central portion of the back surface of the clamping plate. Since both the contact surfaces are of tapered surfaces, the center of the connecting tube 10 is positioned in the center of the clamping plate 4 during the pressing, thus automatically effecting centering.

A rotary shaft 19 for reverse rotation is provided in parallel to one end of a rotary shaft 15a of the worm gear 15 with gears 20, 21 mounted thereon meshed with each other, and on the shaft end is provided carriers 22, 23 capable of inserting a rotary shaft 24a of an electric motor or an electrically-driven drill 24.

In the mold-thickness adjusting apparatus 7 constructed as described above, when the worm gear 15 is rotated, the connecting tube 10 rotates and at the same time the clamping ram 6 moves. With this, the clamping plate 4 also moves and a spacing between it and the fixed plate 2 varies.

The moving amount of the clamping plate 4 can be read from the display device 8. This display device 8 comprises an axial sheath member 8a fixed to the side of the ram 6 and a scale 8b inserted into the sheath member 8a so as to be moved into and out of the member 8a and mounted on the side of the clamping plate 4, so that the moving dimension of the clamping plate 4 may be indicated with an open edge of the sheath member 8a as a reference.

Fastening or releasing of the connecting tube 10 from the clamping plate 4 may be easily accomplished merely by rotating the fastening member 13 through the operation of a handle 25. After being fastened, the clamping ram 6 and the connecting tube 10 are integrally formed in terms of construction, and the clamping force generated by the clamping cylinder 5 is effectively transmitted to the central portion to the clamping plate 4.

Figure 5:
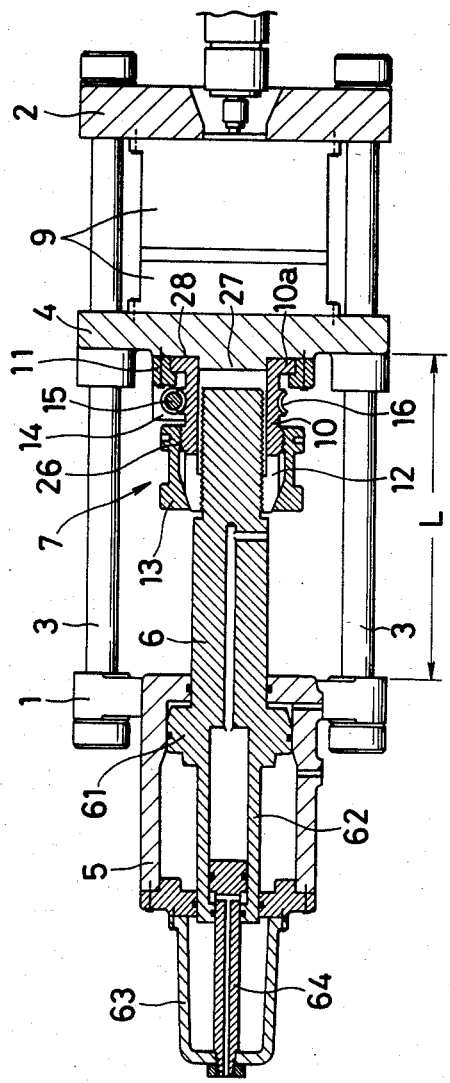
FIG. 5 is a longitudinal sectional side view of a clamping mechanism provided with a mold-thickness adjusting apparatus according to a further embodiment of the present invention.
Figure 6:
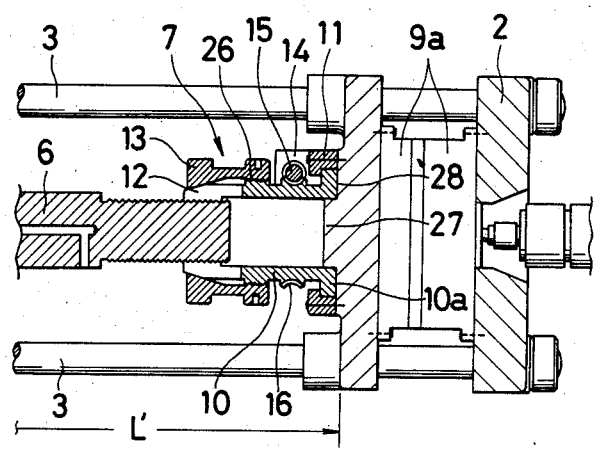
FIG. 6 is a longitudinal sectional view of major portions showing a position of a movable plate after the mold-thickness has been adjusted.

FIGS. 5 and 6 show the case where the construction of the mold-thickness adjusting apparatus 7 is further simplified as compared with the aforementioned embodiment.

While in the first embodiment, the fastening member 13 is provided over the the cylinder portion of the connecting ring 11 and the chuck 12 of the connecting tube 10, it is to be noted in this second embodiment that the cylindrical portion is omitted and the fastening member 13 is threadedly engaged with the connecting tube 10.

A thread portion 26 for threadedly engaging the fastening member 13 is provided between the gear 16 of the connecting tube 10 and the chuck 12, and the threads formed internally of the front end of the fastening member 13 is threadedly engaged with the thread portion 26 to reduce the chuck 12 in diameter and fasten the connecting tube 10 to the extreme end of the clamping ram 6.

In this embodiment, the extreme end of the connecting tube 10 is formed flatly, the central portion of the back surface of the clamping plate 4 is circularly projected, and the extreme end of the connecting tube 10 is fitted into an annular groove 28 formed between the connecting ring 11 and the projection 27 to make the connection between the connecting tube 10 and the clamping plate 4 positive.

According to the present invention, as will be apparent from the description of the embodiments, the position of the clamping plate 4 can be adjusted back and forth according to the thickness of molds 9, 9a at the connecting portion between the clamping plate 4 and the clamping ram 6, and therefore, the clamping cylinder 5 may be designed to be shorter than that of conventional case.

Furthermore, as shown in FIG. 5, even in the case where the inside diameter of the cylinder except the extreme end thereof is formed to be larger than the diameter of a piston 61 to escape pressure oil from a clearance in the periphery of the piston in order to reduce hydraulic resistance of the piston 61 within the clamping cylinder 5 during the mold opening and closing operation, the position of the piston 61 at the time of clamping is always the same without being affected by the position of the clamping plate 4, in other words, even if the length L between the fixed plate 1 and the clamping plate 4 should be changed into L' due to the difference in mold-thickness, the position of the piston 61 at the closed position remains unchanged and is always in the position shown in FIG. 5 for carrying out the clamping. As the result, it is also possible to carry out the mold opening and closing at high speeds by a booster cylinder 62 operatively connected to the rear portion of the clamping ram 6 and a booster ram 64 connected to a member 63 at the rear of the clamping cylinder 5.

Moreover, the mold-thickness adjustment by movement of the clamping plate 4 may be accomplished merely by mounting the mold, thereafter rotating the connecting tube 10 by electrically-driven means, manually rotating the fastening member 13 and integrally coupling the connecting tube 10 and clamping ram 6 by means of the chuck 12. Thus, the operation is simple and it takes little time.

What is claimed is:

1. A mold-thickness adjusting apparatus in a clamping mechanism for molding synthetic resins in which a clamping plate is mounted on a plurality of tie bars provided over a pair of fixed plates on a machine bed, said clamping plate being connected to a clamping ram of a clamping cylinder said clamping cylinder, provided on one of said fixed plates, and a mold mounted on the other fixed plate, said apparatus comprising a connecting ring secured to a central portion of a back surface of the clamping plate, a connecting tube rotatably fitted in the connecting ring having an extreme end in contact with the back surface of the clamping plate, said connecting tube having a chuck portion provided at a rear end thereof, said chuck portion being movably threadedly engaged with an extreme end of a clamping ram, and a member adapted to reduce in diameter a chuck formed in the rear end of the connecting tube, said member connecting, said clamping plate and said clamping ram, and a gear for rotating said connecting tube to adjust a position of said clamping plate according to a mold-thickness, said gear being meshed with a circumferential portion of a shell of said connecting tube and said connecting ring.

2. A mold-thickness adjusting apparatus according to claim 1, wherein said connecting tube has an outer peripheral surface whereby a thread portion is locked in the outer peripheral surface between a gear portion and a chuck portion, and a member for fasenting the chuck portion is threadedly engaged with said thread portion.

3. A mold-thickness adjusting apparatus according to claim 1, wherein the extreme end of said connecting tube is formed into an umbrella-shape, a projecting edge in the periphery of said extreme end is engaged with a shoulder internally of a retainer ring whereby the connecting tube and the clamping plate are connected through the retainer ring, and the extreme end surface of the connecting tube is brought into contact with a tapered surface in the periphery of a ram inserting hole bored in the central portion of the back surface of the clamping plate.

4. A mold-thickness adjusting apparatus according to claim 1, wherein the gear for rotating said connecting tube comprises a worm gear, and a shaft portion of the worm gear is provided at the end thereof with a connecting member with respect to a rotary driving means.

5. A mold-thickness adjusting apparatus according to claims 1 or 3, wherein the apparatus further comprising a rotary driving means which comprises an electric motor connected to the gear for rotating said connecting tube.

6. A mold-thickness adjusting apparatus according to claim 1, wherein the apparatus further comprises a display device, said display device comprising an axial sheath member mounted on a side of the clamping ram and a scale inserted into said sheath member so as to be moved into and out of the sheath member and mounted on the side of the clamping plate, said display device indicating a moving dimension of the clamping plate with an open edge of said sheath member as a reference.

* * * * *